(12) United States Patent
Hashimoto et al.

(10) Patent No.: US 11,123,938 B2
(45) Date of Patent: Sep. 21, 2021

(54) BEAD CORE COATING METHOD AND BEAD CORE COATING APPARATUS

(71) Applicant: TOYO TIRE & RUBBER CO., LTD., Itami (JP)

(72) Inventors: Yoshiki Hashimoto, Itami (JP); Ryoshi Miyamoto, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 222 days.

(21) Appl. No.: 16/134,478

(22) Filed: Sep. 18, 2018

(65) Prior Publication Data

US 2019/0084259 A1 Mar. 21, 2019

(30) Foreign Application Priority Data

Sep. 19, 2017 (JP) .............................. JP2017-178607

(51) Int. Cl.
*B29D 30/50* (2006.01)
*B29D 30/48* (2006.01)

(52) U.S. Cl.
CPC .............. *B29D 30/50* (2013.01); *B29D 30/48* (2013.01); *B29D 2030/482* (2013.01)

(58) Field of Classification Search
CPC ........ B29D 30/18; B29D 30/32; B29D 30/34; B29D 30/48; B29D 30/50; B29D 2030/3221; B29D 2030/3257; B29D 2030/3271; B29D 2030/482; B29D 2030/485; B29D 2030/487
USPC .............................................. 156/130.7, 136
See application file for complete search history.

(56) References Cited

U.S. PATENT DOCUMENTS 2,605,195 A * 7/1952 Boughton .............. B29D 30/32
156/132

FOREIGN PATENT DOCUMENTS

| CN | 105881949 A | * | 8/2016 |
| JP | 49-15778 A | | 2/1974 |
| JP | 2006-130757 A | | 5/2006 |

(Continued)

OTHER PUBLICATIONS

Chen Y et al., CN-105881949-A, machine translation. (Year: 2016).*

(Continued)

*Primary Examiner* — Robert C Dye
*Assistant Examiner* — Sedef E Paquette
(74) *Attorney, Agent, or Firm* — Westerman, Hattori, Daniels & Adrian, LLP

(57) ABSTRACT

A bead core coating method for coating an annular bead core with a belt-shaped rubber sheet, including the steps of: winding the rubber sheet around an outer circumferential surface of a rotary drum; sticking a central portion of the rubber sheet to an outer surface of the bead core; and winding both ends in the width direction of the rubber sheet stuck on the outer surface of the bead core while sequentially sticking both ends in the width direction along the outer surface of the bead core from the central portion in the width direction toward each end in the width direction, wherein in the step of sticking, air is blown to a gap generated between the central portion in the width direction of the rubber sheet and the outer circumferential surface of the rotary drum at a place where the rubber sheet is peeled from the rotary drum.

12 Claims, 11 Drawing Sheets

(56) References Cited

FOREIGN PATENT DOCUMENTS

JP          2012-240334 A      12/2012

OTHER PUBLICATIONS

Office Action dated Jun. 19, 2020, issued in counterpart CN application No. 201811088054.2, with English translation. (17 pages).

* cited by examiner

BEAD CORE COATING METHOD AND BEAD CORE COATING APPARATUS

BACKGROUND OF THE INVENTION

Field of the Invention

The present invention relates to a bead core coating method and a bead core coating apparatus for coating an annular bead core with a belt-shaped rubber sheet.

Description of the Related Art

An annular bead core formed by coating a steel-wire bundle with rubber is typically disposed in a bead portion of a pneumatic tire. The surface of the bead core may be coated with a thin rubber sheet to integrate steel wires and the like. The rubber sheet is sometimes called cover rubber or bead cover rubber.

Patent Document 1 describes a bead core coating apparatus and a bead core coating method for coating the surface of the bead core with a sheet member made of rubber. The bead core coating apparatus of Patent Document 1 includes: a supply unit that supplies a belt-shaped sheet member that covers the surface of the rotating bead core; a forming roller that rotates along a rotation direction of the bead core, surrounds the sheet member supplied from the supply unit in the width direction, and sticks a part of the sheet member to the bead core while forming the part along a sectional shape of the bead core; and a crimping roller that is provided on a downstream side in a rotation direction of the bead core with respect to the forming roller, contacts with the sheet member stuck to the surface of the bead core, and rotates in a direction of an end of the sheet member from a contact position.

A bobbin around which the sheet member previously molded into a long, thin belt shape having a predetermined width is wound so as to be laminated is disposed in the supply unit that supplies the sheet member. A step of previously winding the sheet member around the bobbin is required in a method for supplying the sheet member stocked in the bobbin to the bead core. It is also necessary to dispose a film between the sheet members such that the sheet members laminated on the bobbin are not bonded to each other, which increases cost. Further, in the case that the sheet member is stuck to the bead core, a step of peeling off the film is required, which increases work man-hour. In the case that the film is peeled off, tension is applied to the sheet member to generate a size change.

Patent Document 2 describes a method and an apparatus for winding cover rubber around the bead core. The apparatus of Patent Document 2 includes a let-off device that supplies the cover rubber, a festooner to which the cover rubber supplied from the let-off device is fed, and a bead covering device that coats the bead core with the cover rubber. The festooner absorbs a speed difference of the cover rubber between the let-off device and the bead covering device. However, the use of the festooner applies the tension to the cover rubber, and the size change is generated to degrade accuracy.

PRIOR ART DOCUMENT

Patent Document

Patent Document 1: JP-A-2012-240334
Patent Document 2: JP-A-49-15773

SUMMARY OF THE INVENTION

An object of the present invention is to provide a bead core coating method and a bead core coating apparatus capable of accurately coating the bead core with a belt-shaped rubber sheet while suppressing the cost and the work man-hours.

The above object can be achieved by the present invention as described below.

More specifically, a bead core coating method according to the present invention is a bead core coating method for coating an annular bead core with a belt-shaped rubber sheet, the bead core coating method including the steps of:

winding the rubber sheet extruded through a mouthpiece by an extruder around an outer circumferential surface of a rotary drum from a leading end of the rubber sheet;

sticking, from the leading end, a central portion in a width direction of the rubber sheet existing on the outer circumferential surface of the rotary drum to an outer surface of the bead core which is in rotation before the rubber sheet is wound around an entire circumference of the outer circumferential surface of the rotary drum; and winding both ends in the width direction of the rubber sheet stuck on the outer surface of the bead core while sequentially sticking both the ends in the width direction along the outer surface of the bead core from the central portion in the width direction toward each end in the width direction, wherein in the step of sticking, from the leading end, the central portion in the width direction of the rubber sheet existing on the outer circumferential surface of the rotary drum to the outer surface of the bead core which is in rotation, air is blown to a gap generated between the central portion in the width direction of the rubber sheet and the outer circumferential surface of the rotary drum at a place where the rubber sheet is peeled from the rotary drum.

According to the bead core coating method having this configuration, the belt-shaped rubber sheet extruded by an extruder is wound around the outer circumferential surface of rotary drum from the leading end, a central portion in the width direction of the rubber sheet wound around the outer circumferential surface of the rotary drum is stuck to the outer surface of the bead core from the leading end, and both ends in the width direction of the rubber sheet is wound around the outer surface of the bead core. That is, the rubber sheet extruded from the extruder is directly stuck to the outer surface of the bead core through the rotary drum. According to this configuration, the stock of the bobbin used in the method of Patent Document 1 is unnecessary, and the cost and the work man-hour can be suppressed.

In the conventional method, the accuracy of the cover rubber is degraded due to the size change caused by the tension during the winding around the bobbin, the tension during the peeling of the film, the tension during conveyance using the festooner, and shrinkage at a conveyance line. On the other hand, in the present invention, the rubber sheet extruded from the extruder is stuck to the outer surface of the bead core after wound around the outer circumferential surface of the rotary drum, so that the size change can be prevented to accurately coat the bead core with the rubber sheet. The rubber sheet is wound around the bead core immediately after extruded from the extruder, so that an adhesive failure to the bead core can be improved without being affected by a decrease in tack due to a change with time.

The rubber sheet existing on the outer circumferential surface of the rotary drum is stuck to the outer surface of the bead core in the central portion in the width direction, so that both the ends in the width direction are peeled from the outer circumferential surface of the rotary drum so as to be pulled toward the central portion in the width direction. For this reason, both the ends in the width direction of the rubber sheet tend to be warped. When both the ends in the width direction of the rubber sheet are stuck along the outer surface of the bead core in a subsequent step while warped, both the ends in the width direction are bent to degrade the accuracy. According to the present invention, in the step of sticking the rubber sheet on the outer circumferential surface of the rotary drum to the outer surface of the bead core, by blowing the air to the gap generated between the central portion in the width direction of the rubber sheet and the outer circumferential surface of the rotary drum at the place where the rubber sheet is peeled from the rotary drum, both the ends in the width direction can smoothly be peeled from the rotary drum to prevent the warp at both the ends in the width direction, so that the bead core can accurately be coated with the rubber sheet.

In the bead core coating method according to the present invention, the air may be blown from the gap toward the ends in the width direction of the rubber sheet.

According to this configuration, both the ends in the width direction of the rubber sheet can surely be peeled from the rotary drum.

In the bead core coating method according to the present invention, the rubber sheet immediately after the rubber sheet is peeled from the rotary drum may be held by a holding roller disposed on an opposite side to the bead core with the rubber sheet interposed between the bead core and the holding roller.

According to this configuration, the rubber sheet can be held immediately after the peeling, so that the shape of the rubber sheet can be stabilized.

In the bead core coating method according to the present invention, the air may be blown to both the ends in the width direction of the rubber sheet from a rotary drum side toward a bead core side after both the ends in the width direction of the rubber sheet are peeled from the rotary drum by blowing the air to a gap generated between the central portion in the width direction of the rubber sheet and the outer circumferential surface of the rotary drum.

According to this configuration, the shape of the rubber sheet can be controlled even if the warp is generated at both the ends in the width direction of the rubber sheet.

The above object can be achieved by the present invention as described below.

More specifically, a bead core coating apparatus according to the present invention is a bead core coating apparatus that coats an annular bead core with a belt-shaped rubber sheet, the bead core coating apparatus including:

an extruder that extrudes the rubber sheet;

a rotary drum that winds the rubber sheet extruded from the extruder;

a covering device that supports the bead core such that an outer circumferential surface of the rotary drum and an outer surface of the bead core come closer to each other at a position on a downstream side in a rotation direction of the rotary drum with respect to the extruder, the covering device rotating the supported bead core;

an air injection mechanism that is disposed on a downstream side in a rotation direction of the bead core with respect to a position where an outer circumferential surface of the rotary drum and an outer surface of the bead core are close to each other; and a controller that controls the extruder, the rotary drum, the covering device, and the air injection mechanism, wherein the controller winds the rubber sheet extruded from the extruder from a leading end of the rubber-sheet around the outer circumferential surface of the rotary drum, sticks, from the leading end, a central portion in a width direction of the rubber sheet existing on the outer circumferential surface of the rotary drum to the outer surface of the bead core which is in rotation before the rubber sheet is wound around an entire circumference of the outer circumferential surface of the rotary drum, winds both ends in the width direction of the rubber sheet stuck on the outer surface of the bead core while sequentially sticking both the ends in the width direction along the outer surface of the bead core from the central portion in the width direction toward each of the end in the width direction using the covering device, and the controller causes the air injection mechanism to blow air to a gap generated between the central portion in a width direction of the rubber sheet and the outer circumferential surface of the rotary drum at a place where the rubber sheet is peeled from the rotary drum.

The effects of the bead core coating apparatus having the configuration are described above, and the bead core can accurately be coated with the belt-shaped rubber sheet while the cost and the work man-hour are suppressed.

The bead core coating apparatus according to the present invention may further include a holding roller that is disposed on a downstream side in a rotation direction of the bead core with respect to the air injection mechanism and on an opposite side to the bead core with the rubber sheet interposed between the bead core and the holding roller, the holding roller holding the rubber sheet immediately after the rubber sheet is peeled from the rotary drum.

According to this configuration, the rubber sheet can be held immediately after the peeling, so that the shape of the rubber sheet can be stabilized.

DETAILED DESCRIPTION OF THE PREFERRED EMBODIMENTS

Hereinafter, embodiments of the present invention will be described with reference to the drawings. In a bead core coating method and a bead core coating apparatus of the present invention, an annular bead core is coated with a belt-shaped rubber sheet. Although the bead core of the present embodiment is described as the bead core having a hexagonal shape in section, the sectional shape of the bead core that can be coated by the bead core coating method and the bead core coating apparatus of the present invention is not limited to the hexagon, but the sectional shape of the bead core may be a square or a circular shape.

Figure 1:
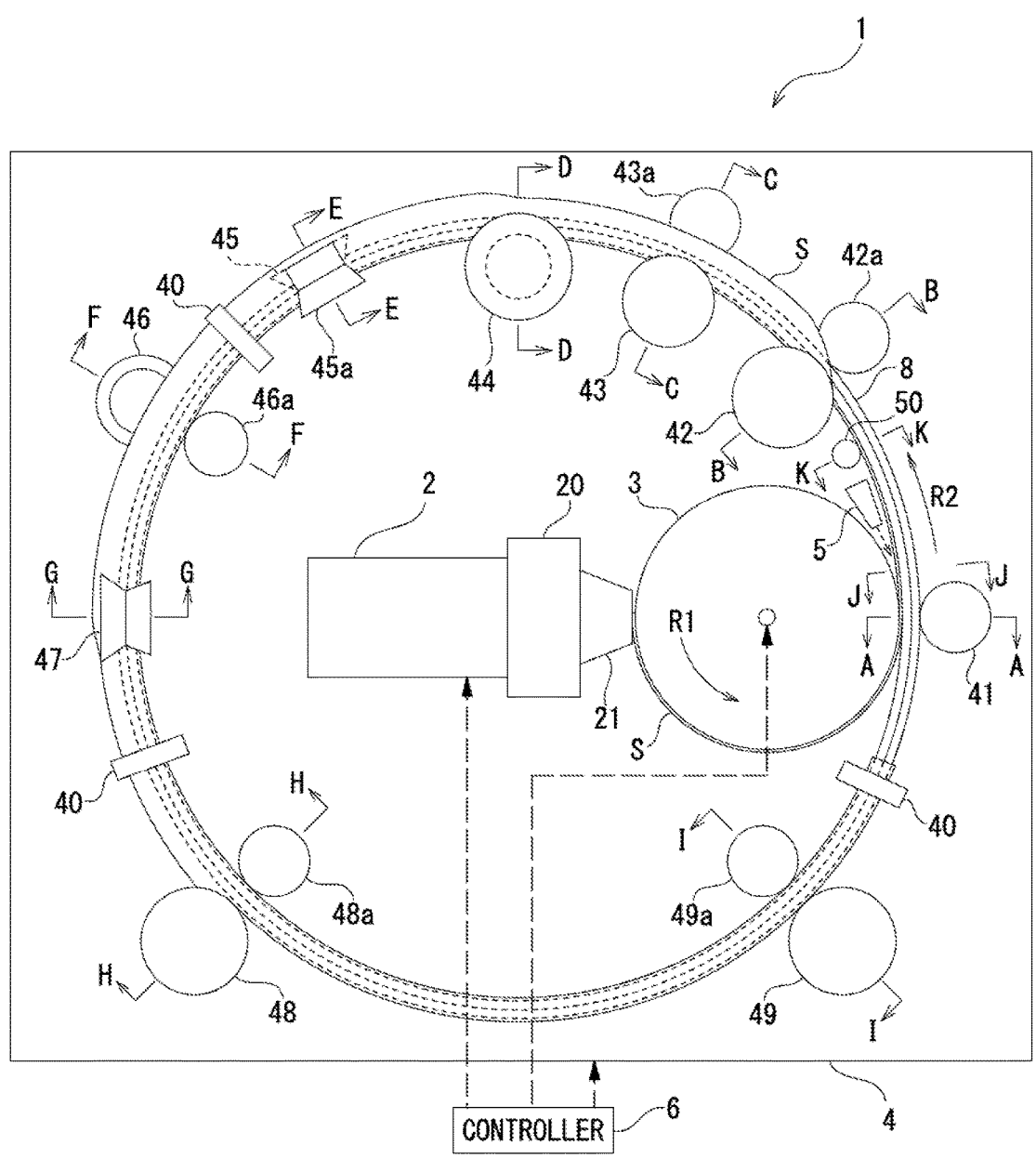
FIG. 1 is a schematic diagram illustrating an example of a configuration of a bead core coating apparatus.

FIG. 1 is a schematic diagram illustrating an example of a configuration of a bead core coating apparatus 1. The bead core coating apparatus 1 includes an extruder 2, a rotary drum 3, a covering device 4, an air nozzle 5 (corresponding to an air injection mechanism), and a controller 6 that controls the extruder 2, the rotary drum 3, the covering device 4, and the air nozzle 5.

Figure 2:
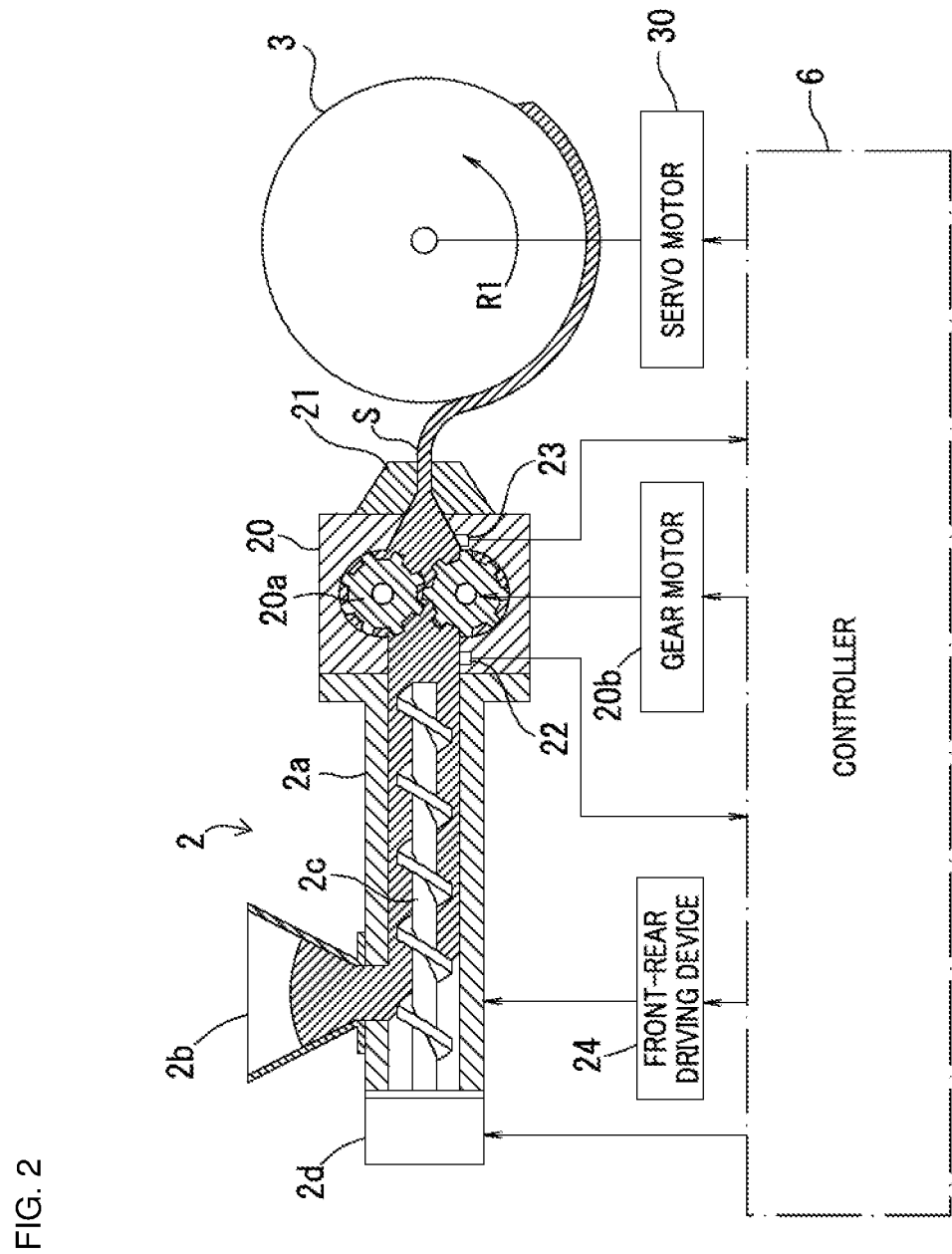
FIG. 2 is a schematic diagram illustrating an example of configurations of an extruder and a rotary drum.

FIG. 2 is a schematic diagram illustrating an example of configurations of the extruder 2 and the rotary drum 3. The extruder 2 has a cylindrical barrel 2a, a hopper 2b connected to a supply port of the barrel 2a, a screw 2c that kneads rubber and sends the rubber to a leading end side, and a screw motor 2d that rotates the screw 2c. As described later, the controller 6 controls a rotation speed of the screw motor 2d.

A gear pump 20 is connected to the leading end side in an extrusion direction of the extruder 2, and the leading end side of the gear pump 20 is connected to a mouthpiece 21. A rubber material kneaded by the extruder 2 is supplied to the gear pump 20, and the gear pump 20 supplies a fixed amount of rubber to the mouthpiece 21. From the mouthpiece 21, a rubber sheet S is extruded with a predetermined extrusion amount.

The gear pump 20 includes a pair of gears 20a, and has a function of sending the rubber to an outlet side toward the mouthpiece 21. The pair of gears 20a is rotationally driven by a gear motor 20b, and the rotation speeds of the gears 20a are controlled by the controller 6. The rotation speed of the gear motor 20b and the rotation speed of the screw motor 2d are linked with each other under the control of the controller 6, which allows the control of the extrusion amount of the rubber sheet S extruded from the mouthpiece 21. For convenience, the pair of gears 20a is vertically arranged in FIG. 2. However, the pair of gears 20a may actually be arranged in a planar direction (a direction in which a rotation axis of the gear 20a becomes vertical in FIG. 2).

A first pressure sensor 22 is provided on an inlet side of the gear pump 20, namely, on a side close to the extruder 2, and detects pressure of the rubber supplied from the extruder 2. A second pressure sensor 23 is provided on the outlet side of the gear pump 20 to detect pressure of the rubber sheet S extruded from the mouthpiece 21.

The pressure on the inlet side of the gear pump 20 is determined by the amount of rubber feed by the gear 20a of the gear pump 20 and the screw 2c of the extruder 2. When the pressure on the inlet side is kept constant, the gear pump 20 can supply a fixed amount of rubber to the mouthpiece 21, and the amount of the rubber extruded from the mouthpiece 21 is stabilized. However, when the pressure on the inlet side is unstable, the amount of rubber extruded from the mouthpiece 21 varies, and the rubber sheet S having a desired size is hardly molded.

A method for performing proportional-integral differential (PID) control on the rotation speed of the gear 20a of the gear pump 20 and the rotation speed of the screw 2c of the extruder 2 is known as a method for controlling the pressure on the inlet side of the gear pump 20. The PID control is typically used in extruding the rubber continuously and quantitatively.

The controller 6 controls the rotation speed of the screw motor 2d of the extruder 2 based on the pressure on the inlet side of the gear pump 20 detected by the first pressure sensor 22. The controller 6 controls the rotation speed of the gear motor 20b based on a predetermined control program (of a time coefficient).

In the present embodiment, what is called an external gear pump in which the gear pump 20 is connected to the leading end side in the extrusion direction of the extruder 2 is used by way of example. Alternatively, a gear pump built-in type extruder in which the gear pump is incorporated may be used. In the present invention, the extrusion amount of the gear pump built-in type extruder can more easily be controlled as compared with the extruder to which the external gear pump is connected, and necessity of the gear motor is eliminated, so that preferably the leading end of the extruder becomes compact.

The extruder 2, the gear pump 20, and the mouthpiece 21 are movable together back and forth in the extrusion direction by a front-rear driving device 24, and can move closer to or away from the rotary drum 3. The backward and forward movement is also controlled by the controller 6.

The rotary drum 3 is rotatable in a direction R1 by a servo motor 30. The rotation speed of the servo motor 30 is controlled by the controller 6. The rubber sheet S extruded through the mouthpiece 21 is supplied to the outer circumferential surface of the rotary drum 3, and the rotary drum 3 is rotated in the direction R1 while the rubber sheet S is stuck to the outer circumferential surface of the rotary drum 3, which allows the rubber sheet S to be wound along a circumferential direction. The outer circumferential surface of the rotary drum 3 is made of metal. For example, an outer diameter of the rotary drum 3 of the present embodiment ranges from 200 mm to 400 mm.

The rotary drum 3 preferably includes a cooling mechanism that cools an outer circumferential surface. For example, a water-cooled mechanism that circulates cooling water an the rotary drum 3 is used as the cooling mechanism. The outer circumferential surface of the rotary drum 3 is subjected to a surface treatment that facilitates peeling of the stuck rubber sheet S, or made of a material that facilitates peeling of the stuck rubber sheet S.

The covering device 4 supports a bead core 8 such that the outer circumferential surface of the rotary drum 3 and the outer surface of the bead core 8 are brought close to each other at a position on a downstream side of the extruder 2 in the rotation direction R1 of the rotary drum 3, and the covering device 4 rotates the supported bead core 8. In the present embodiment, the position where the leading end of the mouthpiece 21 of the extruder 2 and the outer circumferential surface of the rotary drum 3 are the closest to each other and the position where the inner circumferential surface of the bead core 8 and the outer circumferential surface of the rotary drum 3 are the closest to each other are shifted by 180° in the rotation direction R1 of the rotary drum 3. In the present embodiment, an outer diameter of the rotary drum 3 is smaller than an inner diameter of the bead core 8, and the rotary drum 3 is disposed on the inner circumferential side of the bead core 8 supported by the covering device 4.

The covering device 4 winds the rubber sheet S stuck on the outer surface of the bead core 8 along a sectional shape of the bead core 8. The covering device 4 can rotate the supported bead core 8 in an R2 direction. The bead core 8 is rotated according to the rotation of the rotary drum 3.

Figure 3:
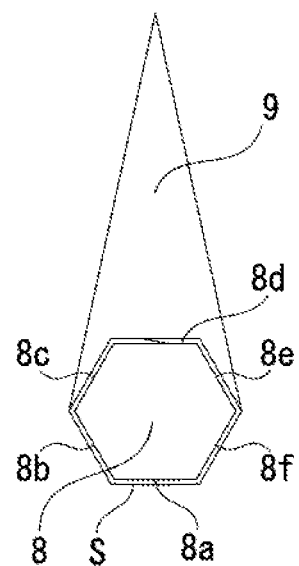
FIG. 3 is a sectional view of a bead core.

FIG. 3 is a sectional view of the bead core 8. The bead core 8 of the present embodiment has a hexagonal shape in section. It is assumed that the inner circumferential surface of the bead core 8 is a lower surface 8a, that the outer circumferential surface is an upper surface 8d, that a side surface on the inner circumferential side is lower side surfaces 8b, 8f, and that a side surface on the outer circumferential side is upper side surfaces 8c, 8e. The rubber sheet S is wound on the surface of the bead core 8. A bead filler 9 having a substantially triangular shape in section is disposed on the outer circumferential side of the bead core 8. For example, the inner diameter of the bead core 8 of the present embodiment ranges from 400 mm to 650 mm.

The covering device 4 includes a pressing roller 41, a first forming roller 42, a lower side surface crimping roller 43, a second forming roller 44, a first upper side surface crimping roller 45, a first bending roller 46, a second upper side surface crimping roller 47, a second bending roller 48, and a finishing roller 49 in this order from the upstream side to the downstream side in the rotation direction R2 of the bead core 8. A plurality of guide rollers 40 that prevent meandering of the rotating bead core 6 are provided in the covering device 4. The covering device 4 includes a holding roller 50 between the pressing roller 41 and the first forming roller 42.

Figure 4A:
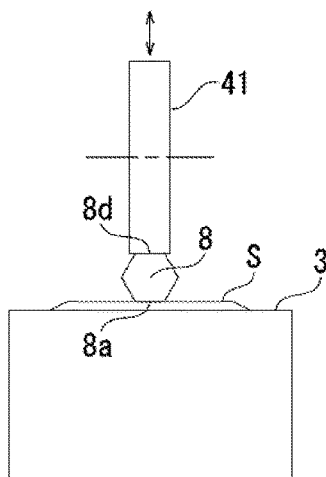
FIG. 4A is a sectional view taken along a line A-A in FIG. 1.

FIG. 4A is a sectional view taken along a line A-A in FIG. 1. The rubber sheet S is wound around the outer circumferential surface of the rotary drum 3. In the section of the rubber sheet S of the present embodiment, both ends in a width direction are thinned, and the thinned portions are overlapped to prevent a joint from being thickened when the rubber sheet S is wound around the surface of the bead core 8 to join both ends in the width direction.

The pressing roller 41 is disposed at a position opposed to the rotary drum 3 with a part of the bead core 8 interposed therebetween. The rotation axis of the pressing roller 41 is parallel to the rotation axes of the rotary drum 3 and the bead core 8, and the pressing roller 41 rotates while the outer circumferential surface of the pressing roller 41 contacts with the upper surface 8d of the bead core 8. The pressing roller 41 is configured to be movable inside and outside in a radial direction of the bead core 8. Consequently, the pressing roller 41 can press the upper surface 8d of the bead core 8 when a part in the width direction of the rubber sheet S on the outer circumferential surface of the rotary drum 3 is stuck to the lower surface 8a of the rotating bead core 8. The pressing roller 41 is a driven roller rotated by the rotation of the bead core 8.

Figure 4B:
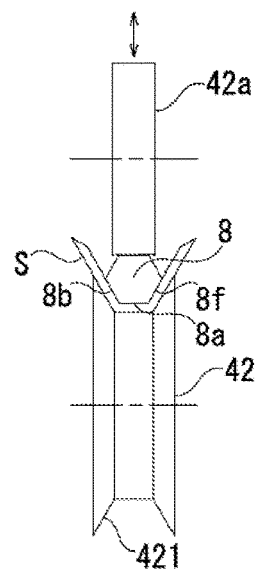
FIG. 4B is a sectional view taken along a line B-B in FIG. 1.

FIG. 4B is a sectional view taken along a line B-B of FIG. 1. The first forming roller 42 is disposed on the inner circumferential side of the bead core 8. The rotation axis of the first forming roller 42 is parallel to the rotation axis of the bead core 8. As illustrated in FIG. 4B, the first forming roller 42 has a bobbin shape in which a center is recessed with respect to the right and left. A recess 421 of the first forming roller 42 is disposed so as to contact with the lower surface 8a and the right and left lower side surfaces 8b, 8f of the bead core 8 with the rubber sheet S interposed therebetween. An auxiliary roller 42a configured to be movable inside and outside in the radial direction of the bead core 8 is disposed at the position that is opposed to the first forming roller 42 with the bead core 8 interposed therebetween. The rotation axis of the auxiliary roller 42a is parallel to the rotation axes of the first forming roller 42 and the bead core 8. Consequently, the rubber sheet S can be folded upward along the right and left lower side surfaces 8b, 8f of the bead core 8 by the recess 421 of the first forming roller 42. The first forming roller 42 and the auxiliary roller 42a are driven rollers rotated by the rotation of the bead core 8.

Figure 4C:
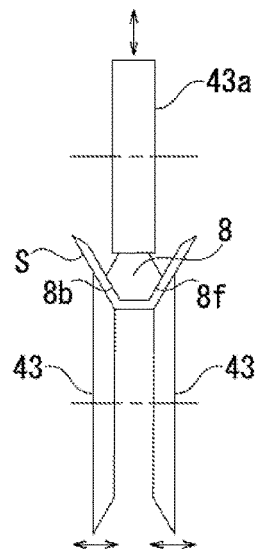
FIG. 4C is a sectional view taken along a line C-C in FIG. 1.

FIG. 4C is a sectional view taken along a line C-C in FIG. 1. The lower side surface crimping roller 43 is disposed on the inner circumferential side of the bead core 8. The rotation axis of the lower side surface crimping roller 43 is parallel to the rotation axis of the bead core 8. The lower side surface crimping rollers 43 are provided on the right and left of the bead core 8 while opposed to each other. The pair of lower side surface crimping rollers 43 is configured to be movable to the right and left in the width direction of the bead core 8. The lower side surface crimping roller 43 has a truncated cone shape, and the outer circumferential surfaces formed into a tapered surface are disposed so as to contact with the lower side surfaces 8b, 8f of the bead core 8 with the rubber sheet S interposed therebetween. An auxiliary roller 43a configured to be movable inside and outside in the radial direction of the bead core 8 is disposed at the position opposed to the lower side surface crimping roller 43 with the bead core 8 interposed therebetween. The rotation axis of the auxiliary roller 43a is parallel to the rotation axes of the lower side surface crimping roller 43 and the bead core 8. Consequently, the rubber sheet S can be crimped to the lower side surfaces 8b, 8f of the bead core 8 by the lower side surface crimping roller 43. The lower side surface crimping roller 43 is a driving roller driven by a motor (not illustrated), and the auxiliary roller 43a is a driven roller rotated by the rotation of the bead core 8.

Figure 4D:
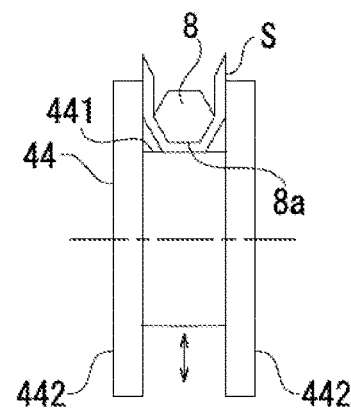
FIG. 4D is a sectional view taken along a line D-D in FIG. 1.

FIG. 4D is a sectional view taken along a line D-D in FIG. 1. The second forming roller 44 is disposed on the inner circumferential side of the bead core 8. The rotation axis of the second forming roller 44 is parallel to the rotation axis of the bead core 8. The second forming roller 44 includes a body unit 441 that rotates along the lower surface 8a of the bead core 8 and disc-shaped flanges 442 that are provided at both ends of the body unit 441. A distance between the right and left flanges 442 is substantially equal to a width obtained by adding the thickness of the rubber sheet S to the width of the bead core 8. The second forming roller 44 is configured to be movable inside and outside in the radial direction of the bead core 8. Consequently, both ends in the width direction of the rubber sheet S can be raised upward by the flange 442 of the second forming roller 44. The second forming roller 44 is a driven roller rotated by the rotation of the bead core 8.

Figure 4E:
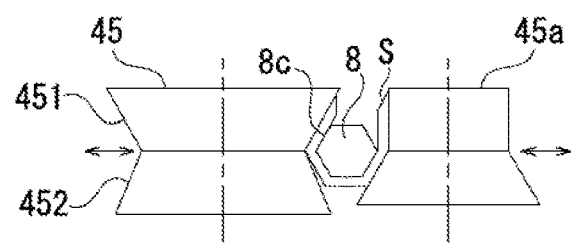
FIG. 4E is a sectional view taken along a line E-E in FIG. 1.

FIG. 4E is a sectional view taken along a line E-E in FIG. 1. The first upper side surface crimping roller 45 is disposed on the side of the bead core 8. The rotation axis of the first upper side surface crimping roller 45 is parallel to the radial direction of the bead core 8. The first upper side surface crimping roller 45 has a bobbin shape in which two truncated cone units 451, 452 are coupled together. The outer circumferential surface of one truncated cone unit 451 is disposed so as to contact with the upper side surface 8c of the bead core 8 with the rubber sheet S interposed therebetween. The first upper side surface crimping roller 45 is configured to be movable to the right and left in the width direction of the bead core 8. An auxiliary roller 45a configured to be movable in the right and left in the width direction of the bead core 8 is disposed at the position opposed to the first upper side surface cramping roller 45 with the bead core 8 interposed therebetween. The rotation axis of the auxiliary roller 45a is parallel to the rotation axis of the first upper side surface crimping roller 45. Consequently, the rubber sheet S can be crimped to the upper side surface 8c of the bead core 8 by the truncated cone unit 451 of the first upper side surface crimping roller 45. The first upper side surface crimping roller 45 is a driving roller driven by a motor (not illustrated), and the auxiliary roller 45a is a driven roller rotated by the rotation of the bead core 8.

Figure 4F:
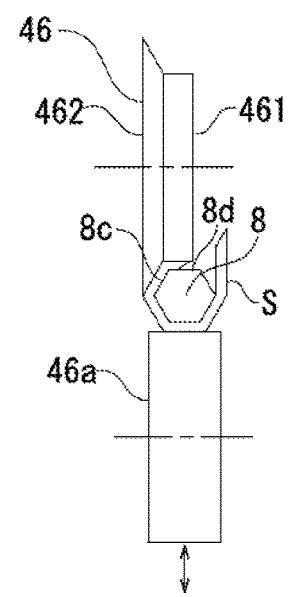
FIG. 4F is a sectional view taken along a line F-F in FIG. 1.

FIG. 4F is a sectional view taken along a line F-F in FIG. 1. The first bending roller 46 is disposed on the outer circumferential side of the bead core 8. The rotation axis of the first bending roller 46 is parallel to the rotation axis of the bead core 8. The first bending roller 46 includes a columnar unit 461 that rotates along the upper surface 8d of the bead core 8 and a truncated cone unit 462 that is provided at one end of the columnar unit 461. The outer circumferential surface of the truncated cone unit 462 is disposed so as to contact with the upper side surface 8c of the bead core 8 with the rubber sheet S interposed therebetween. An auxiliary roller 46a configured to be movable inside and outside in the radial direction of the bead core 8 is disposed at the position opposed to the columnar unit 461 of the first bending roller 46 with the bead core 8 interposed therebetween. The rotation axis of the auxiliary roller 46a is parallel to the rotation axes of the first bending roller 46 and the bead core 8. Consequently, one end of the rubber sheet S can be bent along the upper surface 8d of the bead core 8 by the columnar unit 461 of the first bending roller 46. The first bending roller 46 is a driving roller driven by a motor (not illustrated), and the auxiliary roller 46a is a driven roller rotated by the rotation of the bead core 8.

Figure 4G:
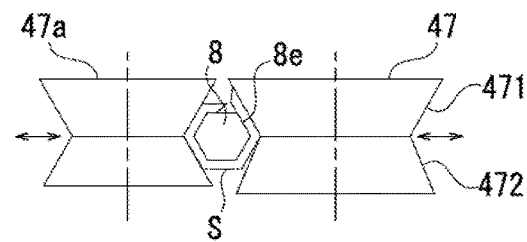
FIG. 4G is a sectional view taken along a line G-G in FIG. 1.

FIG. 4G is a sectional view taken along a line G-G in FIG. 1. The second upper side surface crimping roller 47 is disposed on the side of the bead core 8. The rotation axis of the second upper side surface crimping roller 47 is parallel to the radial direction of the bead core 8. The second upper side surface crimping roller 47 has a bobbin shape in which two truncated cone units 471, 472 are coupled together. The outer circumferential surface of one truncated cone unit 471 is disposed so as to contact with the upper side surface 8e of the bead core 8 with the rubber sheet S interposed therebetween. The second upper side surface crimping roller 47 is configured to be movable to the right and left in the width direction of the bead core 8. An auxiliary roller 47a configured to be movable in the right and left in the width direction of the bead core 8 is disposed at the position opposed to the second upper side surface crimping roller 47 with the bead core 8 interposed therebetween. The rotation axis of the auxiliary roller 47a is parallel to the rotation axis of the second upper side surface crimping roller 47. Consequently, the rubber sheet S can be crimped to the upper side surface 8e of the bead core 8 by the truncated cone unit 471 of the second upper side surface crimping roller 47. The second upper side surface crimping roller 47 is a driving roller driven by a motor (not illustrated), and the auxiliary roller 47a is a driven roller rotated by the rotation of the bead core 8.

Figure 4H:
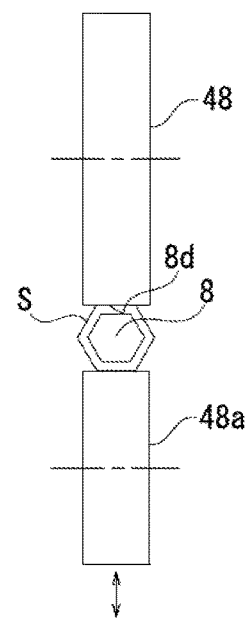
FIG. 4H is a sectional view taken along a line H-H in FIG. 1.

FIG. 4H is a sectional view taken along a line H-H in FIG. 1. The second bending roller 48 is disposed on the outer circumferential side of the bead core 8. The rotation axis of the second bending roller 48 is parallel to the rotation axis of the bead core 8. The second bending roller 48 rotates along the upper surface 8d of the bead core 8. An auxiliary roller 48a configured to be movable inside and outside in the radial direction of the bead core 8 is disposed at the position opposed to the second bending roller 48 with the bead core 8 interposed therebetween. The rotation axis of the auxiliary roller 48a is parallel to the rotation axes of the second bending roller 48 and the bead core 8. Consequently, the other end of the rubber sheet S can be bent along the upper surface 8d of the bead core 8 by the second bending roller 48. The second bending roller 48 is a driving roller driven by a motor (not illustrated), and the auxiliary roller 48a is a driven roller rotated by the rotation of the bead core 8.

Figure 4I:
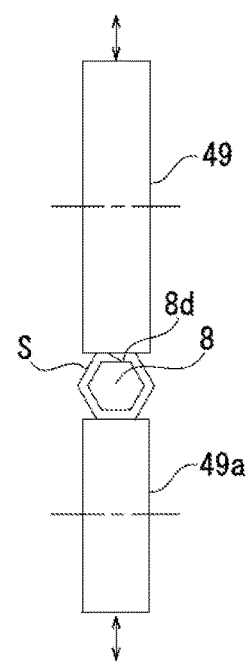
FIG. 4I is a sectional view taken along a line I-I in FIG. 1.

FIG. 4I is a sectional view taken along a line I-I in FIG. 1. The finishing roller 49 is disposed on the outer circumferential side of the bead core 8. The rotation axis of the finishing roller 49 is parallel to the rotation axis of the bead core 8. The finishing roller 49 rotates along the upper surface 8d of the bead core 8. The finishing roller 49 is configured to be movable inside and outside in the radial direction of the bead core 8. An auxiliary roller 49a configured to be movable inside and outside in the radial direction of the bead core 8 is disposed at the position opposed to the finishing roller 49 with the bead core 8 interposed therebetween. The rotation axis of the auxiliary roller 49a is parallel to the rotation axes of the finishing roller 49 and the bead core 8. Consequently, both ends of the rubber sheet S can be crimped to the upper surface 8d of the bead core 8 by the finishing roller 49. The finishing roller 49 is a driving roller driven by a motor (not illustrated), and the auxiliary roller 49a is a driven roller rotated by the rotation of the bead core 8. The finishing roller 49 and the auxiliary roller 49a may include a temperature control mechanism that warms the roller in order to increase crimping force. A temperature control mechanism in which hot water, a heater, or a gas is used is exemplified.

The air nozzle 5 is disposed on the downstream side in the rotation direction R2 of the bead core 8 with respect to a position where the outer circumferential surface of the rotary drum 3 and the outer surface of the bead core 8 are close to each other. The air nozzle 5 of the present embodiment is disposed between the rotary drum 3 and the first forming roller 42. The air nozzles 5 are provided on both sides of the bead core 8.

Figure 4J:
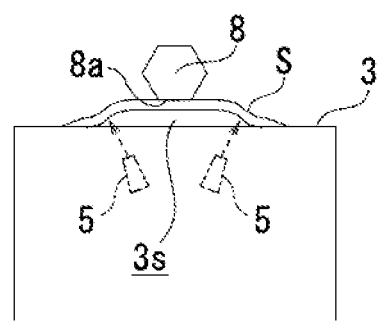
FIG. 4J is a sectional view taken along a line J-J in FIG. 1.

FIG. 4J is a sectional view taken along a line J-J in FIG. 1. The rubber sheet S existing on the outer peripheral surface of the rotary drum 3 is stuck to the outer surface (lower surface 6a) of the bead core 8 in the central portion in the width direction as illustrated in FIG. 4A, so that both the ends in the width direction are peeled from the outer circumferential surface of the rotary drum 3 so as to be pulled toward the central portion in the width direction as illustrated in FIG. 4J. The air nozzle 5 can blow the air to a gap 3s generated between the central portion in the width direction of the rubber sheet S and the outer circumferential surface of the rotary drum 3 at a place where the rubber sheet S is peeled from the cuter circumferential surface of the rotary drum 3 (a position of the line J-J). Consequently, both the ends in the width direction of the rubber sheet S can smoothly be peeled from the rotary drum 3 to prevent the warp at both the ends in the width direction, so that both the warped ends in the width direction can be prevented from being bent by the first forming roller 42 in the step of bending back both the ends in the width direction of the rubber sheet S upward by the first forming roller 42. As a result, the bead core 8 can accurately be coated with the rubber sheet S. The leading end of the rubber sheet S is hardly peeled from the outer circumferential surface of the rotary drum 3, so that the air is particularly effectively blown when the leading end of the rubber sheet S is peeled from the outer circumferential surface of the rotary drum 3.

Preferably, the air nozzle 5 blows the air in a direction from the gap 3s toward the end in the width direction of the rubber sheet S. Consequently, both the ends in the width direction of the rubber sheet S can surely be peeled from the rotary drum 3.

The air nozzle 5 of the present embodiment includes a circular injection port having a diameter of 3 mm. An injection pressure of the air ranges from 0.3 MPa to 0.4 MPa.

Figure 4K:
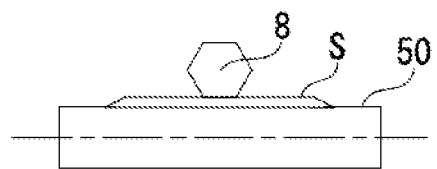
FIG. 4K is a sectional view taken along a line K-K in FIG. 1.

FIG. 4K is a sectional view taken along a line K-K in FIG. 1. The holding roller 50 is disposed on the downstream side in the rotation direction R2 of the bead core 8 with respect to the air nozzle 5. The holding roller 50 is disposed on the opposite side to the bead core 8 with the rubber sheet S interposed therebetween (in the present embodiment, the inner circumferential side of the bead core 8). The width of the holding roller 50 is greater than or equal to the width of the rubber sheet S. The surface of the holding roller 50 is subjected to teflon (registered trademark) coating.

The holding roller 50 can hold the rubber sheet S immediately after the rubber sheet S is peeled from the rotary drum 3. Consequently, the shape of the peeled rubber sheet S can be stabilized to prevent the warp at both ends in the width direction.

A bead core coating method using the bead core coating apparatus 1 will be described below. The bead core coating method of the present invention includes a step of winding the rubber sheet S extruded through the mouthpiece 21 by the extruder 2 around the outer circumferential surface of the rotary drum 3 from a leading end of the rubber sheet S; a step of sticking the central portion in the width direction of the rubber sheet S existing on the outer circumferential surface of the rotary drum 3 to an outer surface of the bead core 8 which is in rotation, before the rubber sheet S is wound around an entire circumference of the outer circumferential surface of the rotary drum 3; and a step of winding both ends in the width direction of the rubber sheet S stuck on the outer surface of the bead core 8 while sequentially sticking both the ends in the width direction along the outer surface of the bead core 8 from the central portion in the width direction toward each end in the width direction. In the step of sticking the central portion in the width direction of the rubber sheet S existing on the outer circumferential surface of the rotary drum 3 to the outer surface of the rotating bead core 8 from the leading end, air is blown to the gap 3s generated between the central portion in the width direction of the rubber sheet S and the outer circumferential surface of the rotary drum 3 at the place where the rubber sheet S is peeled from the rotary drum 3.

First, the bead core 8 is set on the covering device 4. At this point, the extruder 2 is disposed outside the covering device 4.

Subsequently, the extruder 2 is advanced toward the rotary drum 3, and the mouthpiece 21 is brought close to the outer circumferential surface of the rotary drum 3.

Subsequently, the extrusion of the rubber sheet S from the mouthpiece 21 of the extruder 2 is started, and the rotation of the rotary drum 3 is started at the same time. Consequently, the extruded rubber sheet S can be wound around the outer circumferential surface of the rotary drum 3 from the leading end of the rubber sheet S.

Subsequently, the central portion in the width direction of the rubber sheet S wound around the outer circumferential surface of the rotary drum 3 is stuck to the lower surface 8a of the rotating bead core 8 from the leading end of the rubber sheet S (see FIG. 4A).

Subsequently, in the rubber sheet S stuck to the lower surface 8a of the bead core 8, both ends in the width direction of the rubber sheet S is wound along the outer surface of the bead core 8 by the covering device A (see FIGS. 4B to 4I). In the step of sticking the rubber sheet S to the outer surface of the bead core 8, the air is blown to the gap 3s generated between the central portion in the width direction of the rubber sheet S and the outer circumferential surface of the rotary drum 3 at the place where the rubber sheet S is peeled off from the rotary drum 3 (see FIG. 4J). Finally, the extruder 2 is retracted, and the bead core 8 coated with the rubber sheet S is removed from the covering device 4.

Figure 5:
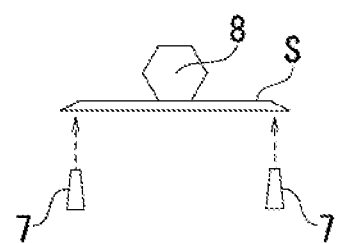
FIG. 5 is a schematic sectional view illustrating another example of the configuration of the bead core coating apparatus.

Other Embodiments (1) The covering device A may include a second air nozzle 7 disposed on the downstream side in the rotation direction R2 of the bead core 8 with respect to the air nozzle 5. The second air nozzle 7 is disposed on the upstream side in the rotation direction R2 of the bead core 8 with respect to of the holding roller 50. That is, the second air nozzle 7 is disposed between the air nozzle 5 and the holding roller 50. The second air nozzle 7 can blow the air in a direction from the inner circumference side to the outer circumference side of the bead core 8 (in a direction toward the radial outside). As illustrated in FIG. 5, the second air nozzle 7 blows the air to both ends in the width direction of the rubber sheet S from the side of the rotary drum 3 to the side of the bead core 8 after the air nozzle 5 blows the air to the rubber sheet S to peel both the ends in the width direction of the rubber sheet S from the rotary drum 3. Consequently, the shape of the rubber sheet S can be controlled even if the warp is generated at both the ends in the width direction of the rubber sheet S. The air nozzle same as the air nozzle 5 can be used as the second air nozzle 7.

Figure 6:
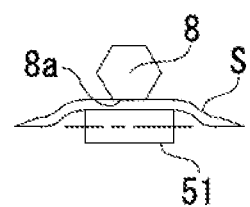
FIG. 6 is a schematic sectional view illustrating another example of the configuration of the bead core coating apparatus.

(2) The covering device 4 may include a second holding roller 51 disposed on the downstream side in the rotation direction R2 of the bead core 8 with respect to the air nozzle 5 and on the upstream side in the rotation direction R2 of the bead core 8 with respect to the second air nozzle 7. As illustrated in FIG. 6, the width of the second holding roller 51 is smaller than the width of the rubber sheet S, and is larger than the width of the bead core 8. The surface of the second holding roller 51 is subjected to the teflon coating. The second holding roller 51 is inserted in the gap 3s to surely peel both the ends in the width direction of the rubber sheet S in the case that the both the ends in the width direction of the rubber sheet S are insufficiently peeled by the air nozzle 5.

Figure 7:
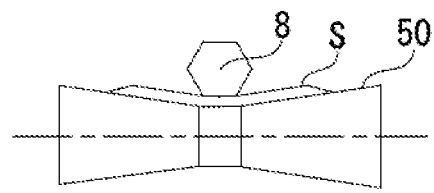
FIG. 7 is a schematic sectional view illustrating another example of the configuration of the bead core coating apparatus.

(3) In the above embodiment, the holding roller 50 has a straight shape. However, the present invention is not limited to this configuration. The holding roller 50 may have a tapered shape as illustrated in FIG. 7.

(4) in the above embodiment, by way of example, the central portion in the width direction of the rubber sheet S wound around the outer circumferential surface of the rotary drum 3 is stuck to the inner circumferential surface (lower surface 8a) of the rotating bead core 8 from the leading end of the rubber sheet S. However, the present invention is not limited to this configuration.

Figure 8:
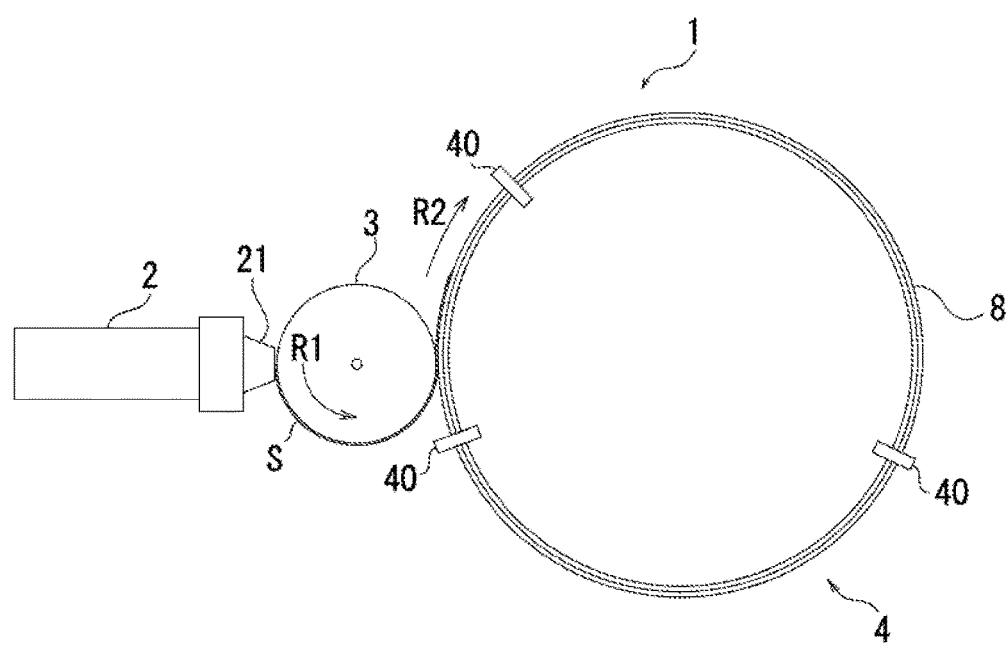
FIG. 8 is a schematic diagram illustrating another example of the configuration of the bead core coating apparatus.

For example, as illustrated in FIG. 8, the rotary drum 3 is disposed on the outer circumferential side of the bead core 8, and the central portion in the width direction of the rubber sheet S wound around the outer circumferential surface of the rotary drum 3 may be stuck to the outer circumferential surface of the rotating bead core 8 from the leading end of the rubber sheet S. According to this configuration, a facility layout is simplified, and a size of the bead core can easily be changed.

Alternatively, the rotary drum 3 is disposed on the side of the bead core 8, and the central portion in the width direction of the rubber sheet S wound around the outer circumferential surface of the rotary drum 3 may be stuck to the side surface of the rotating bead core 8 from the leading end of the rubber sheet S. According to this configuration, similarly to the configuration in FIG. 8, the facility layout is simplified, and the size of the bead core can easily be changed.

(5) In the above embodiment, by way of example, the position where the leading end of the mouthpiece 21 of the extruder 2 and the outer circumferential surface of the rotary drum 3 are the closest to each other and the position where the inner circumferential surface of the bead core 8 and the outer circumferential surface of the rotary drum 3 are the closest to each other are shifted by 180° in the rotation direction R1 of the rotary drum 3. However, the present invention is not limited to this configuration, but the positions are shifted by 90° or 270° in the rotation direction R1.

What is claimed is:

1. A bead core coating method for coating an annular bead core with a belt-shaped rubber sheet, the bead core coating method comprising the steps of:
    winding the rubber sheet extruded through a mouthpiece by an extruder around an outer circumferential surface of a rotary drum from a leading end of the rubber sheet;
    sticking, from the leading end, a central portion in a width direction of the rubber sheet existing on the outer circumferential surface of the rotary drum to an outer surface of the bead core which is in rotation before the rubber sheet is wound around an entire circumference of the outer circumferential surface of the rotary drum; and
    winding both ends in the width direction of the rubber sheet stuck on the outer surface of the bead core while sequentially sticking both the ends in the width direction along the outer surface of the bead core from the central portion in the width direction toward each end in the width direction,
    wherein in the step of sticking, from the leading end, the central portion in the width direction of the rubber sheet existing on the outer circumferential surface of the rotary drum to the outer surface of the bead core which is in rotation, air is blown to a gap generated between the central portion in the width direction of the rubber sheet and the outer circumferential surface of the rotary drum at a place where the rubber sheet is peeled from the rotary drum, and
    the rubber sheet immediately after the rubber sheet is peeled from the rotary drum is held by a holding roller disposed on an opposite side to the bead core with the rubber sheet interposed between the bead core and the holding roller.

2. The bead core coating method according to claim 1, wherein the air is blown from the gap toward the ends in the width direction of the rubber sheet.

3. The bead core coating method according to claim 1, wherein the air is blown to both the ends in the width direction of the rubber sheet from a rotary drum side toward a bead core side after both the ends in the width direction of the rubber sheet are peeled from the rotary drum by blowing the air to a gap generated between the central portion in the width direction of the rubber sheet and the outer circumferential surface of the rotary drum.

4. The bead core coating method according to claim 1, where a position where a leading end of the mouthpiece of the extruder and the outer circumferential surface of the rotary drum are closest to each other and a position where an inner circumferential surface of the bead core and the outer circumferential surface of the rotary drum are closest to each other is shifted by 90° to 270° in a rotation direction of the rotary drum.

5. The bead core coating method according to claim 4, where the position where the leading end of the mouthpiece of the extruder and the outer circumferential surface of the rotary drum are closest to each other and the position where the inner circumferential surface of the bead core and the outer circumferential surface of the rotary drum are closest to each other is shifted by 180° in the rotation direction of the rotary drum.

6. The bead core coating method according to claim 1, further comprising a covering device that supports the bead core, wherein the covering device comprises a pressing roller, a first forming roller, a lower side surface crimping roller, a second forming roller, a first upper side surface crimping roller, a first bending roller, a second upper side surface crimping roller, a second bending roller, and a finishing roller in stated order from an upstream side to a downstream side in a rotation direction of the bead core.

7. The bead core coating method according to claim 1, wherein the air nozzle comprises a circular injection port having a diameter of 3 mm, and an injection pressure of the air ranges from 0.3 MPa to 0.4 MPa.

8. A bead core coating apparatus that coats an annular bead core with a belt-shaped rubber sheet, the bead core coating apparatus comprising:
    an extruder that extrudes the rubber sheet;
    a rotary drum that winds the rubber sheet extruded from the extruder;
    a covering device that supports the bead core such that an outer circumferential surface of the rotary drum and an outer surface of the bead core come closer to each other at a position on a downstream side in a rotation direction of the rotary drum with respect to the extruder, the covering device rotating the supported bead core;
    an air injection mechanism that is disposed on a downstream side in a rotation direction of the bead core with respect to a position where an outer circumferential surface of the rotary drum and an outer surface of the bead core are close to each other; and
    a controller that controls the extruder, the rotary drum, the covering device, and the air injection mechanism,
    a holding roller that is disposed on the downstream side in the rotation direction of the bead core with respect to the air injection mechanism and on an opposite side to the bead core with the rubber sheet interposed between the bead core and the holding roller
    wherein the controller winds the rubber sheet extruded from the extruder from a leading end of the rubber sheet around the outer circumferential surface of the rotary drum, sticks, from the leading end, a central portion in a width direction of the rubber sheet existing on the outer circumferential surface of the rotary drum to the outer surface of the bead core which is in rotation before the rubber sheet is wound around an entire circumference of the outer circumferential surface of the rotary drum, winds both ends in the width direction of the rubber sheet stuck on the outer surface of the bead core while sequentially sticking both the ends in the width direction along the outer surface of the bead core from the central portion in the width direction toward each of the ends in the width direction using the covering device, the controller causes the air injection mechanism to blow air to a gap generated between the central portion in a width direction of the rubber sheet and the outer circumferential surface of the rotary drum at a place where the rubber sheet is peeled from the rotary drum, and the holding roller holds the rubber sheet immediately after the rubber sheet is peeled from the rotary drum.

9. The bead core coating apparatus according to claim 8, where a position where a leading end of a mouthpiece of the extruder and the outer circumferential surface of the rotary drum are closest to each other and a position where an inner circumferential surface of the bead core and the outer circumferential surface of the rotary drum are closest to each other is shifted by 90° to 270° in a rotation direction of the rotary drum.

10. The bead core coating apparatus according to claim 9, where the position where the leading end of the mouthpiece of the extruder and the outer circumferential surface of the rotary drum are closest to each other and the position where the inner circumferential surface of the bead core and the outer circumferential surface of the rotary drum are closest to each other is shifted by 180° in the rotation direction of the rotary drum.

11. The bead core coating apparatus according to claim 8, wherein the covering device comprises a pressing roller, a first forming roller, a lower side surface crimping roller, a second forming roller, a first upper side surface crimping roller, a first bending roller, a second upper side surface crimping roller, a second bending roller, and a finishing roller in stated order from an upstream side to a downstream side in a rotation direction of the bead core.

12. The bead core coating apparatus according to claim 8, wherein the air nozzle comprises a circular injection port having a diameter of 3 mm, and an injection pressure of the air ranges from 0.3 MPa to 0.4 MPa.

* * * * *